US011050332B2

(12) United States Patent
Bradfield

(10) Patent No.: US 11,050,332 B2
(45) Date of Patent: Jun. 29, 2021

(54) ENHANCED PERMANENT MAGNET CLAW POLE SEGMENT GEOMETRY

(71) Applicant: BorgWarner Inc., Auburn Hills, MI (US)

(72) Inventor: Michael D. Bradfield, Anderson, IN (US)

(73) Assignee: BorgWarner Inc., Auburn Hills, MI (US)

( * ) Notice: Subject to any disclaimer, the term of this patent is extended or adjusted under 35 U.S.C. 154(b) by 103 days.

(21) Appl. No.: 16/420,991

(22) Filed: May 23, 2019

(65) Prior Publication Data
US 2019/0363592 A1 Nov. 28, 2019

Related U.S. Application Data

(60) Provisional application No. 62/676,062, filed on May 24, 2018.

(51) Int. Cl.
H02K 21/04 (2006.01)
H02K 1/24 (2006.01)
H02K 15/03 (2006.01)

(52) U.S. Cl.
CPC ........... *H02K 21/044* (2013.01); *H02K 15/03* (2013.01)

(58) Field of Classification Search
CPC ............ H02K 1/00; H02K 1/22; H02K 1/226; H02K 1/24; H02K 1/243; H02K 1/28;
(Continued)

(56) References Cited

U.S. PATENT DOCUMENTS 5,382,862 A * 1/1995 Ward ................. H02K 1/02
148/121
5,973,435 A 10/1999 Irie et al.
(Continued)

FOREIGN PATENT DOCUMENTS

CN 103390945 A 11/2013
DE 19802784 A1 7/1999
(Continued)

OTHER PUBLICATIONS

International Search Report and Written Opinion in corresponding application PCT/US2019/033783, dated Sep. 24, 2019.

*Primary Examiner* — Tran N Nguyen
(74) *Attorney, Agent, or Firm* — Maginot, Moore & Beck, LLP

(57) ABSTRACT

A pole piece (106) for a rotor (100) of a rotary electric machine (20) includes a hub portion (104) and a plurality of pole segments (106) distributed evenly about the hub portion (104). The pole segments each have a base (116) that is connected to the hub portion (104) and a tip (118) that is disposed axially opposite the base (116) along an axis (60) of the pole piece (106). Each pole segment (106) defines circumferentially opposite side surfaces (120, 122) that extend between the base (116) and the tip (118). Each pole segment (106) also defines radially opposite outer and inner surfaces (124, 126) that extend between the side surfaces (120, 122). A groove is recessed in the side surfaces (120, 122) of each pole segment (106). A radially innermost portion (136) of the groove (130, 132) is arranged proximate to the radially outer surface.

19 Claims, 9 Drawing Sheets

(58) Field of Classification Search
CPC ...... H02K 15/03; H02K 21/00; H02K 21/044; H02K 21/12; H02K 21/14
See application file for complete search history.

(56) References Cited

U.S. PATENT DOCUMENTS

| | | |
|---|---|---|
| 6,002,194 A | 12/1999 | Asao |
| 8,810,101 B2 | 8/2014 | Kondo |
| 2004/0036376 A1* | 2/2004 | Pflueger ............... H02K 21/044 310/263 |
| 2015/0214794 A1 | 7/2015 | Chang et al. |

FOREIGN PATENT DOCUMENTS

| | | |
|---|---|---|
| EP | 1717928 A1 | 2/2006 |
| JP | 2007336723 A | 12/2007 |
| JP | 2010035317 A | 2/2010 |
| JP | 2010110169 A | 5/2010 |
| JP | 2010130823 A | 6/2010 |
| JP | 4735980 B2 | 5/2011 |
| JP | 2014117020 A | 6/2014 |
| KR | 101396284 B1 | 5/2014 |

\* cited by examiner

ENHANCED PERMANENT MAGNET CLAW POLE SEGMENT GEOMETRY

CROSS-REFERENCE TO RELATED APPLICATIONS

This document claims priority to U.S. provisional patent application No. 62/676,062, filed May 24, 2018, the entire contents of which are incorporated herein by reference.

FIELD

This application relates to the field of electric machines and, particularly, to the incorporation of permanent magnets on the pole segments of claw-pole type rotary electric machines.

BACKGROUND

Alternators are used to convert mechanical energy from a vehicle engine into electrical energy for the vehicle. The electrical energy produced by the alternator is used to charge the vehicle battery, and may also be used to power electric loads on the vehicle. The alternator generally includes a rotatable field coil positioned on a rotor. The rotor is rotably positioned within a stator having a plurality of stator windings. Operation of the engine results in rotation of the rotor and the field coil. Current flowing through the rotating field coil results in a related current induced in the stator windings. Current flowing through the stator windings provides an output voltage that is rectified and delivered to the vehicle battery and/or electric loads on the vehicle.

Modern vehicle alternators include a regulator that controls the current through the field coil. When more current is provided to the field coil, the output of the alternator increases. When less current is provided to the field coil, the output of the alternator decreases. Several different rotating electro-mechanical machine designs exist. One common design is the Lundell, or "claw-pole," design. The claw-pole design is often used for dynamoelectric machines, such as alternators. In a claw-pole machine, the rotor includes claw-shaped pole pieces (usually a pair of pole pieces) located around one or more field windings. The pole pieces each have a plurality of claw-shaped magnetic pole segments with pole segments of opposing pole pieces interleaved in a meshing relationship.

In some alternators, high-magnetic-strength permanent magnets are disposed between the adjacent pole segments to supplement the magnetic field generated by the field coil. Alternators utilizing both field coil and permanent magnet fluxes coupled to a stator coil are referred to as hybrid alternators. In a hybrid alternator, the permanent magnets maintain a permanent magnet flux across channels that would otherwise be air gaps between the pole segments, which in a hybrid alternator are magnetically linked to the permanent magnets disposed in the channels and carried by the rotor, and a portion of the stator structure, thereby coupling significant magnetic flux through the stator structure. When the field coil is energized, the magnetic flux developed by the permanent magnets additively contributes to the electromagnetically generated magnetic flux resulting from field coil excitation, across the stator/rotor air gap.

Conventionally, the side surfaces of each pole segment where the permanent magnets rest are machined across the entire length of the pole segment and substantially across the entire radial height of the pole segment. This extensive machining forms a large recess in each of the side surfaces of the pole segment. The respective recesses each define radially upper and lower lips or ledges that circumferentially protrude over the radially upper and lower surfaces of an adjacent permanent magnet. A thin stainless steel retainer is positioned between the permanent magnet and an underside of the radially upper lips of two opposing pole segments. The retainer is configured to mechanically support the permanent magnet against the centrifugal forces imparted on the magnet from rotation of the rotor.

The necessary width of the machined radially upper lip for the retainer, and the required pole-to-pole circumferential spacing to minimize flux leakage and provide adequate spacing for axial airflow through the rotor assembly, determines the total width of the magnets. This required width is generally greater than the width required for demagnetization protection of the permanent magnets. Consequently, the permanent magnets used in conventional hybrid alternators are often larger in volume than necessary for electromagnetic purposes.

Accordingly, it would be advantageous to provide a pole piece for a claw-pole rotor that has a pole segment configuration that minimizes the amount of permanent magnet material needed for a given performance level and that reduces the machining costs associated with producing the pole piece. A pole segment configuration that minimizes the risk of demagnetization of the permanent magnet would also be advantageous.

SUMMARY

A rotor for a rotary electric machine in one embodiment includes a first pole piece having a plurality of first pole segments distributed evenly about a rotation axis, the first pole segments each having at least one first groove, a second pole piece having a plurality of second pole segments distributed evenly about the rotation axis and interleaved in a spaced, circumferentially-alternating relationship with the first pole segments, the second pole segments each having at least one second groove, the first and second grooves positioned proximately to respective radially outer surfaces of the first and second pole segments, at least one retainer engaged with the first and second grooves of a circumferentially adjacent pair of first and second pole segments, and at least one permanent magnet disposed between the circumferentially adjacent pair of first and second pole segments and supported against a radially inner surface of the retainer.

A pole piece for a rotor of a rotary electric machine in one embodiment includes a magnetic hub portion configured to rotate about a central axis, and a plurality of magnetic pole segments distributed evenly about a circumference of the hub portion, each pole segment having a base connected to the hub portion and a tip disposed axially opposite the base, the pole segments each defining circumferentially opposite side surfaces that extend between the base and the tip and radially opposite outer and inner surfaces that extend between the side surfaces, each pole segment includes at least one groove that is recessed the side surface, a radially innermost surface portion of the at least one groove arranged closer to the radially outer surface than to the radially inner surface.

A pole piece for a rotor of a rotary electric machine in another embodiment includes a magnetic hub portion configured to be mounted to a shaft of the rotor for rotation about a central axis, the hub portion having an annular first body portion with a first circumference and an annular second body portion protruding axially from the first body portion and with a second circumference, the second circumference being diametrically smaller than the first circumference, and a plurality of magnetic pole segments distributed evenly about the first circumference, the pole segments each having a base connected to the first circumference and a tip disposed axially opposite the base such that the pole segments radially overhang the second circumference and extend axially beyond the second body portion, the pole segments each defining circumferentially opposite side faces that extend between the base and the tip and radially opposite outer and inner surfaces that extend between the side faces, the pole segments each have a pyramidal shape such that the radially inner surface is closer to the central axis at the base than at the tip and the side surfaces are circumferentially wider at the base than at the tip, and respective grooves are recessed in the side surfaces of each pole segment, the grooves extending linearly from the base to the tip of each pole segment and being substantially positioned adjacent to the radially outer surface of the pole segment.

DETAILED DESCRIPTION

Figure 1:
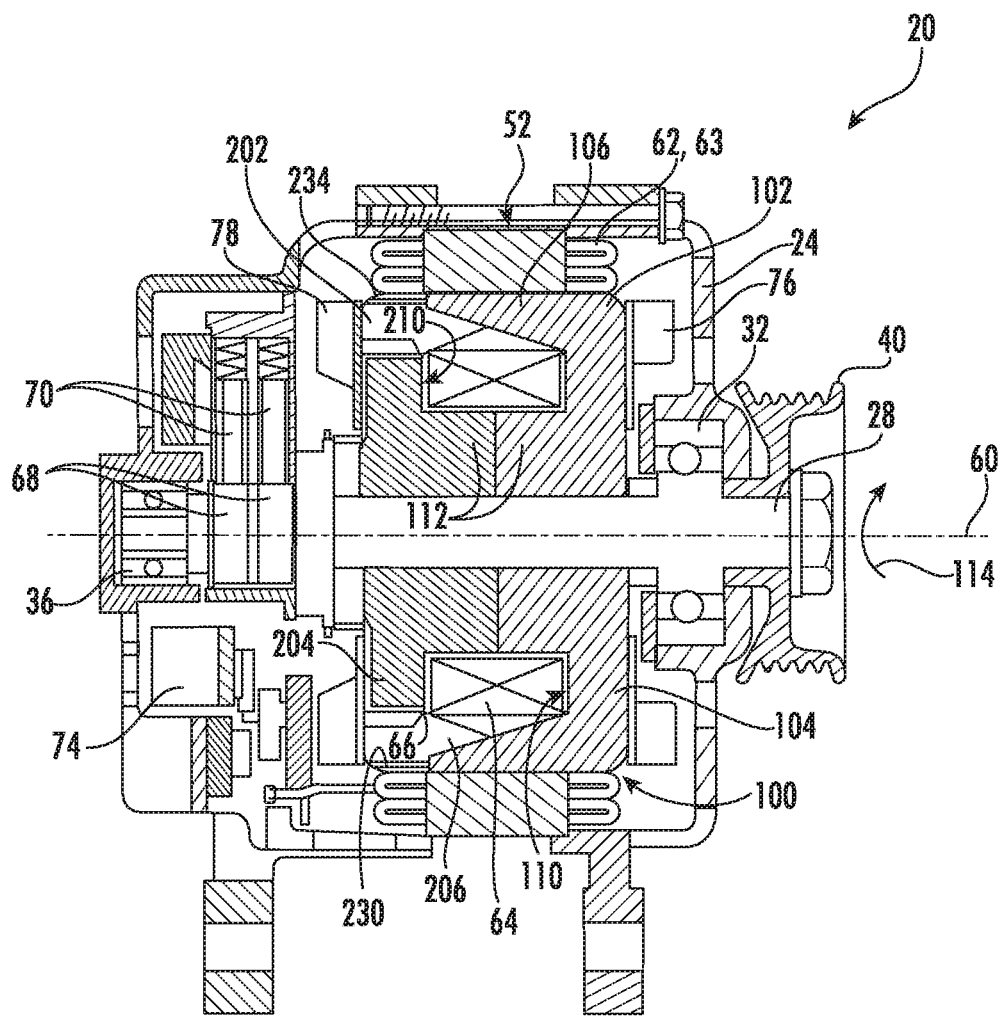
FIG. 1 is a side sectional view of an alternator with a claw-pole rotor that includes first and second pole pieces according to the invention.
Figure 2:
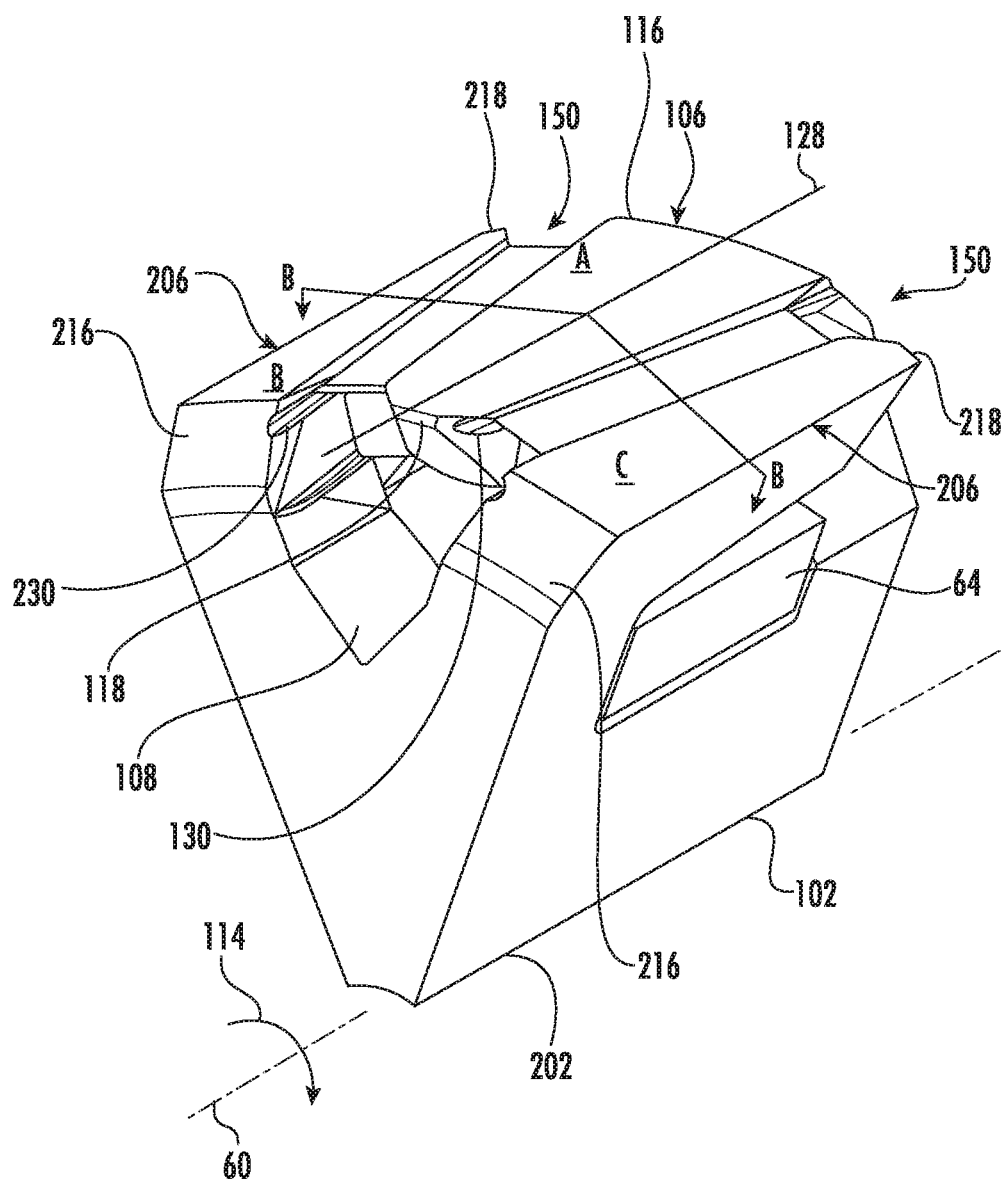
FIG. 2 is a perspective view of a circumferential section of the claw-pole rotor of FIG. 1 illustrating a pole segment of the first pole piece intermeshed with two pole segments of the second pole piece along with respective retainers and magnets inserted between the intermeshed pole segments.

FIGS. 1 and 2 depict a rotor 100 for a rotary electric machine 20. The rotor 100 is configured as a claw-pole rotor and includes a claw-shaped front or first pole piece 102 and a claw-shaped rear or second pole piece 202 with each pole piece 102, 202 mounted for rotation about an axis 60. The pole pieces 102, 202 each have respective first and second pluralities of elongate pole segments (also known as fingers or claws) 106, 206 distributed evenly about respective hub portions 104, 204. The first pole segments 106 extend axially towards the second pole piece 202 and the second pole segments 206 extend axially towards the first pole piece 102 such that the pole segments 106 of one pole piece 102 are interleaved in a non-contacting, spaced relationship with the pole segments 206 of the other pole piece 202, as shown in FIG. 2.

The interleaved, spaced relationship between the first and second pole segments 106, 206 defines air gaps or channels 150 between circumferentially adjacent pole segments 106, 206. The rotary electric machine 20 depicted in FIG. 1 is a hybrid alternator and includes permanent magnets 158 disposed within the channels 150 to supplement the magnetic field generated by a field coil 64 of the alternator 20. To retain the permanent magnets 158 against the centrifugal forces imparted by rotation of the rotor 100, the circumferentially adjacent pole segments 106, 206 each have a respective groove 130, 132, 230, 232 into which a retainer 160 is radially secured to support the permanent magnet 158.

Pole Segments

FIGS. 3-6 illustrate a single pole piece of the rotor 100 to better illustrate the features of the pole segments 106, 206 described herein. Although a single pole piece is depicted in FIGS. 3-6, features are often identified using multiple reference numerals since the first and second pole pieces 102, 202 are essentially identical to one another. Throughout this disclosure, reference numerals in the 100's (i.e., 104, 106, etc.) generally correspond to features of the first pole piece 102 while reference numerals in the 200's (i.e., 204, 206, etc.) generally correspond to features of the second pole piece 202.

The pole segments 106, 206 each have a base or proximal end 116, 216 connected to the respective hub portion 104, 204 at locations between the voids 108. Each pole segment 106, 206 also has a tip or distal end 118, 218 that is disposed axially opposite its respective base 116, 216. When the first and second pole pieces 102, 202 are mounted to the shaft 28, the tips 118, 218 of the pole segments 106, 206 of one pole piece 102, 202 are located near the base 116, 216 of the pole segments 106, 206 of the other pole piece 102, 202, as shown in FIG. 2.

Figure 3:
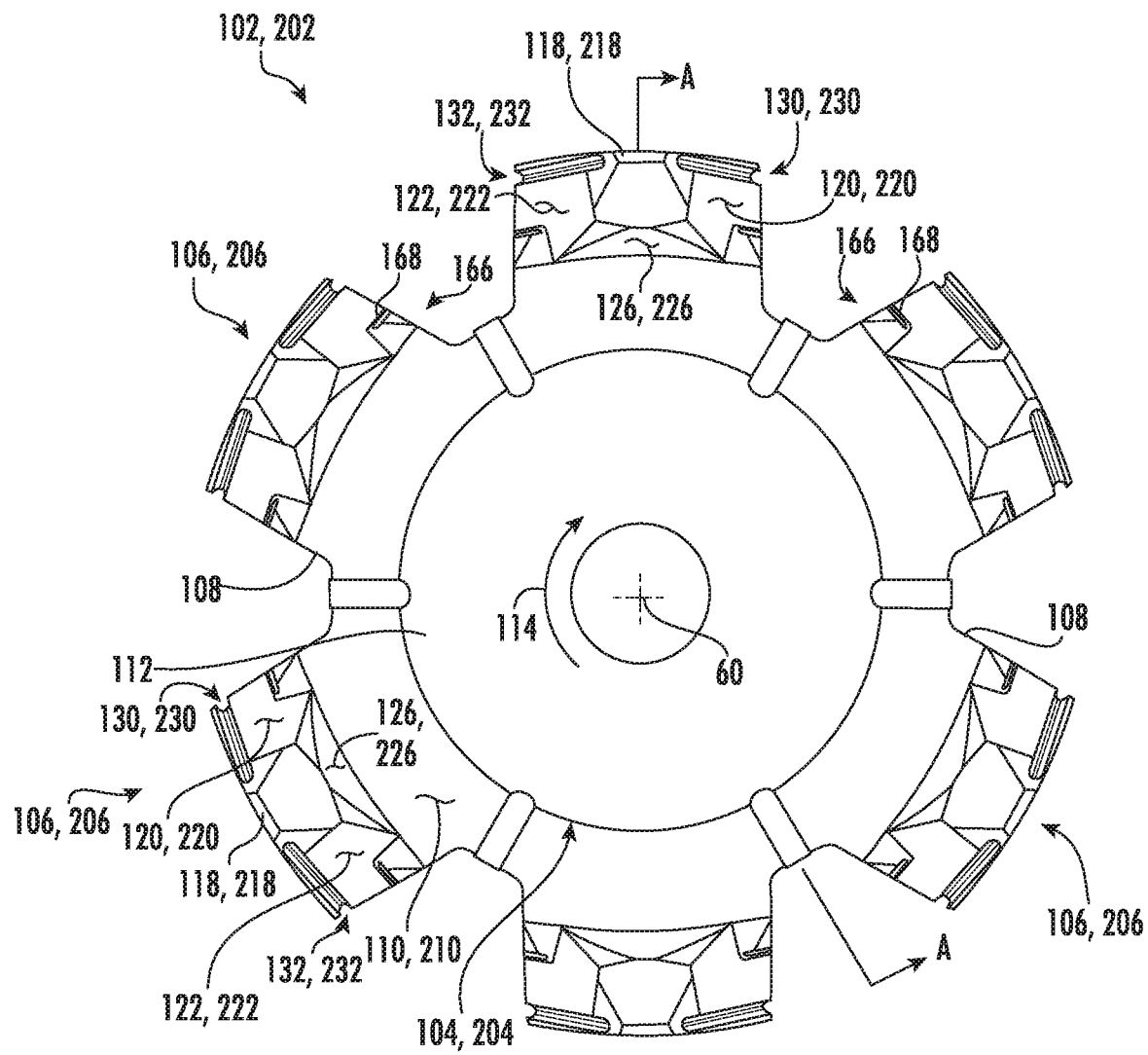
FIG. 3 is a plan view of one of the pole pieces of FIG. 1 with a plurality of pole segments connected to a hub portion of the pole piece as viewed in the direction of a central axis of the alternator.

Each pole segment 106, 206 defines a leading side surface 120, 220 and circumferentially opposite trailing side surface 122, 222, each of which extends between the base 116, 216 and the tip 118, 218 of the pole segment. The designation of a surface 120, 122, 220, 222 as leading or trailing is related to the direction of pole segment travel relative to the stator 52, as indicated by arrow 114. As best shown in FIG. 3, the leading side surfaces 120, 220 of each pole segment 106, 206 face substantially in the same direction in which the pole piece 102, 202 moves as it rotates about the central axis 60. In contrast, the trailing side surfaces 122, 222 of each pole segment 106, 206 face substantially in a direction opposite the direction in which the pole piece 102, 202 moves as it rotates about the central axis 60.

Figure 4:
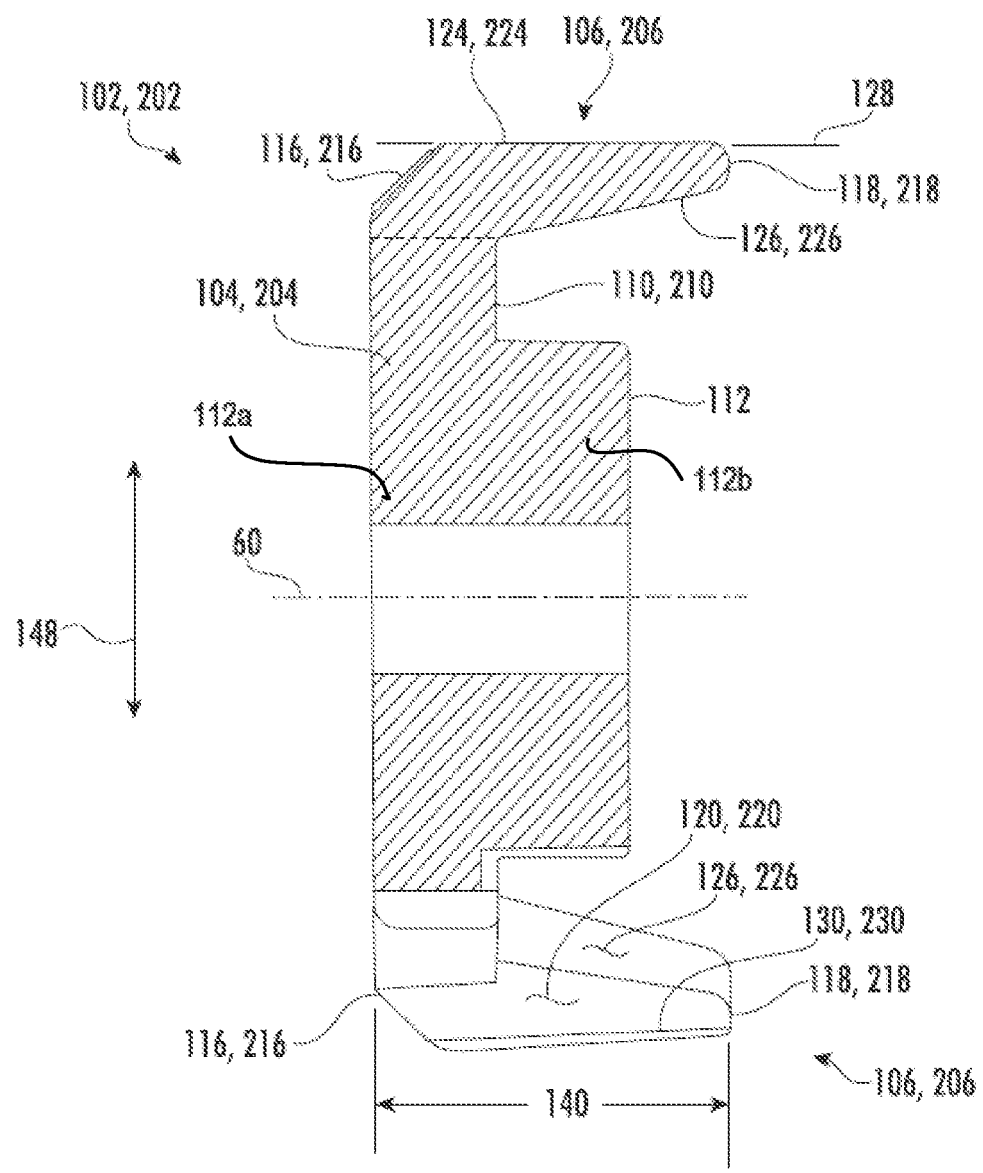
FIG. 4 is a section view of the pole piece of FIG. 3 along line A-A.

Each pole segment 106, 206 also defines a radially outer surface 124, 224 and a radially inner surface 126, 226, each of which extends circumferentially between its leading side surface 120, 220 and trailing side surface 122, 222. As shown in FIGS. 2 and 4, each radially outer surface 124, 224 lies along a respective surface line 128 that is substantially parallel with the central axis 60. Thus, the radially outer surfaces 124, 224 of the plurality of alternating pole segments 106, 206 define the substantially cylindrical outer circumferential surface of the rotor 100.

The pole segments 106, 206 in the embodiment depicted in the figures have a generally pyramidal shape such that the respective radially inner surface 126, 226 is closer to the central axis 60 near its base 116, 216 while the respective radially inner surface 126, 226 is further from the central axis 60 near its tip 118, 218. Thus, each pyramidal pole segment 106, 206 is thicker radially, relative to the axis 60, between its radially outer surface 124, 224 and its radially inner surface 126, 226, at its base 116, 216 than at its tip 118, 218.

When viewed in a radial direction, each pyramidal pole segment 106, 206 is tapered as the pole segment extends away from its respective hub portion 104, 204 and, therefore, is circumferentially wider between its leading and trailing side surface 120, 122, 220, 222 at its base 116, 216 and narrower at its tip 118, 218. Accordingly, each pole segment 106, 206 in the embodiment depicted is generally V-shaped as viewed in both a radial direction relative to the central axis 60, and in a direction normal to an imaginary plane in which the respective surface line 128 and the central axis 60 both lie. In other words, each generally pyramidal pole segment 106, 206, if sectioned at its base 116, 216 by an imaginary plane oriented perpendicular to the central axis 60 and flattened at its tip, is substantially hexahedral.

When viewed in section planes perpendicular to the central axis at various distances along each pyramidal pole segment 106, 206, the respective thickness of each pole segment between its radially outer surface 124, 224 and its radially inner surface 126, 226 is substantially uniform between its leading and trailing side surface 120, 122, 220, 222. This substantially uniform thickness results because the radially outer and inner surfaces 124, 126, 224, 226 are generally flat and featureless between their respective leading and trailing side surfaces 120, 122, 220, 222 although in some embodiments the radially outer and inner surfaces 124, 126, 224, 226 may present slight curvatures about the central axis 60 corresponding to the cylindrical shape of the rotor 100.

Grooves in the Pole Segments

Figure 5:
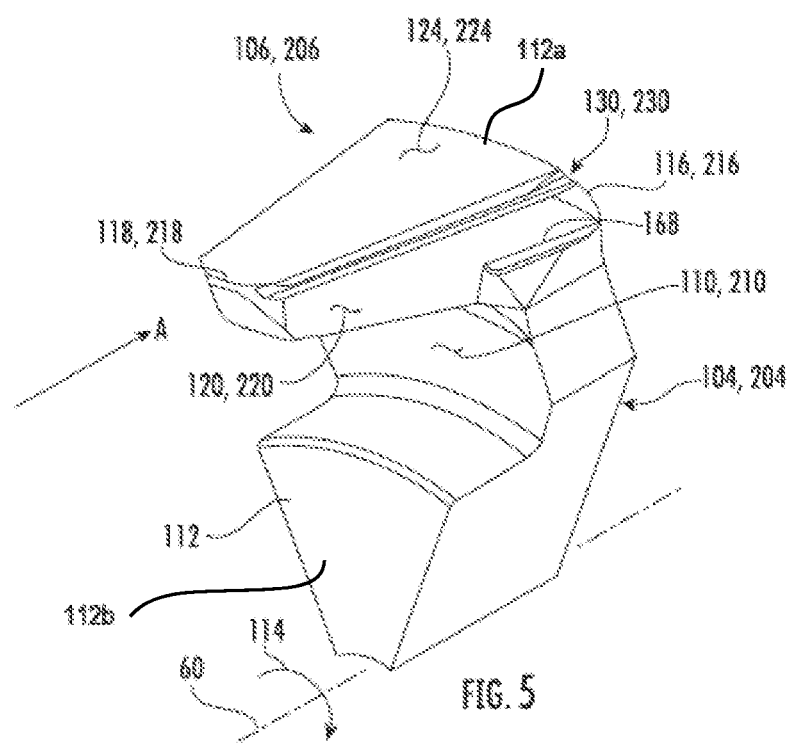
FIG. 5 is a perspective view of a portion of the pole piece of FIG. 3 illustrating one of the plurality of pole segments with circumferentially opposed grooves opening to respective side surfaces of the pole segment.
Figure 6:
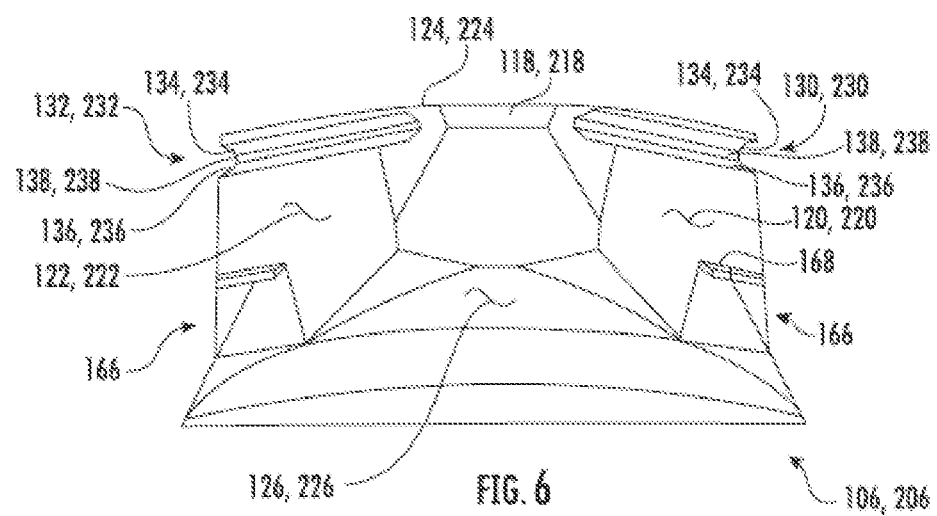
FIG. 6 is an auxiliary view of the pole segment of FIG. 5 in the direction of arrow A.

With reference to FIGS. 5 and 6, each pole segment 106, 206 has circumferentially opposite grooves 130, 132, 230, 232 that are recessed in (or otherwise open to) the leading and trailing side surfaces 120, 122, 220, 222 of the pole segment. The grooves 130, 132, 230, 232 extend generally along a linear path between the base 116, 216 and the tip 118, 218 of each pole segment 106, 206. As best illustrated in FIG. 6, the grooves 130, 132, 230, 232 each have a radially outermost surface portion 134, 234, a radially innermost surface portion 136, 236 spaced from the radially outermost surface portion 134, 234, and a connecting surface portion 138, 238 that connects the radially outermost and innermost surface portions 134, 136, 234, 236. The radially innermost surface portion 136, 236 of each groove 130, 132, 230, 232 is arranged closer to the radially outer surface 124, 224 than to the radially inner surface 126, 226 along the entire axial extent 140 (FIG. 4) of the pole segment 106, 206 between the base 116, 216 and the tip 118, 218. A radial depth 142 (FIG. 9) of the radially innermost surface portion 136, 236 of each groove 130, 132, 230, 232 from the radially outer surface 124, 224 is less than 3.5 mm.

The opening to the grooves 130, 132, 230, 232 at the leading and trailing side surfaces 120, 122, 220, 222 of each pole segment 106, 206 has a radial thickness 144 (FIG. 9) of approximately 0.5 mm measured between the radially outermost and innermost surface portions 134, 136, 234, 236. The radial thickness of the leading and trailing side surfaces 120, 122, 220, 222 is substantially larger than the radial thickness of the opening to the grooves. For instance, the radial thickness of the leading and trailing side surfaces 120, 122, 220, 222 may be on the order of 3 mm such that that ratio of the radial thicknesses of the side surfaces side surfaces 120, 122, 220, 222 is six (6) times the radial thickness of the opening to the grooves 130, 132, 230, 232. In some embodiments, each groove 130, 132, 230, 232 defines a C-shape in a cross-sectional plan oriented normal to the side surface 120, 122, 220, 222, for example as illustrated in FIG. 9.

Figure 9:
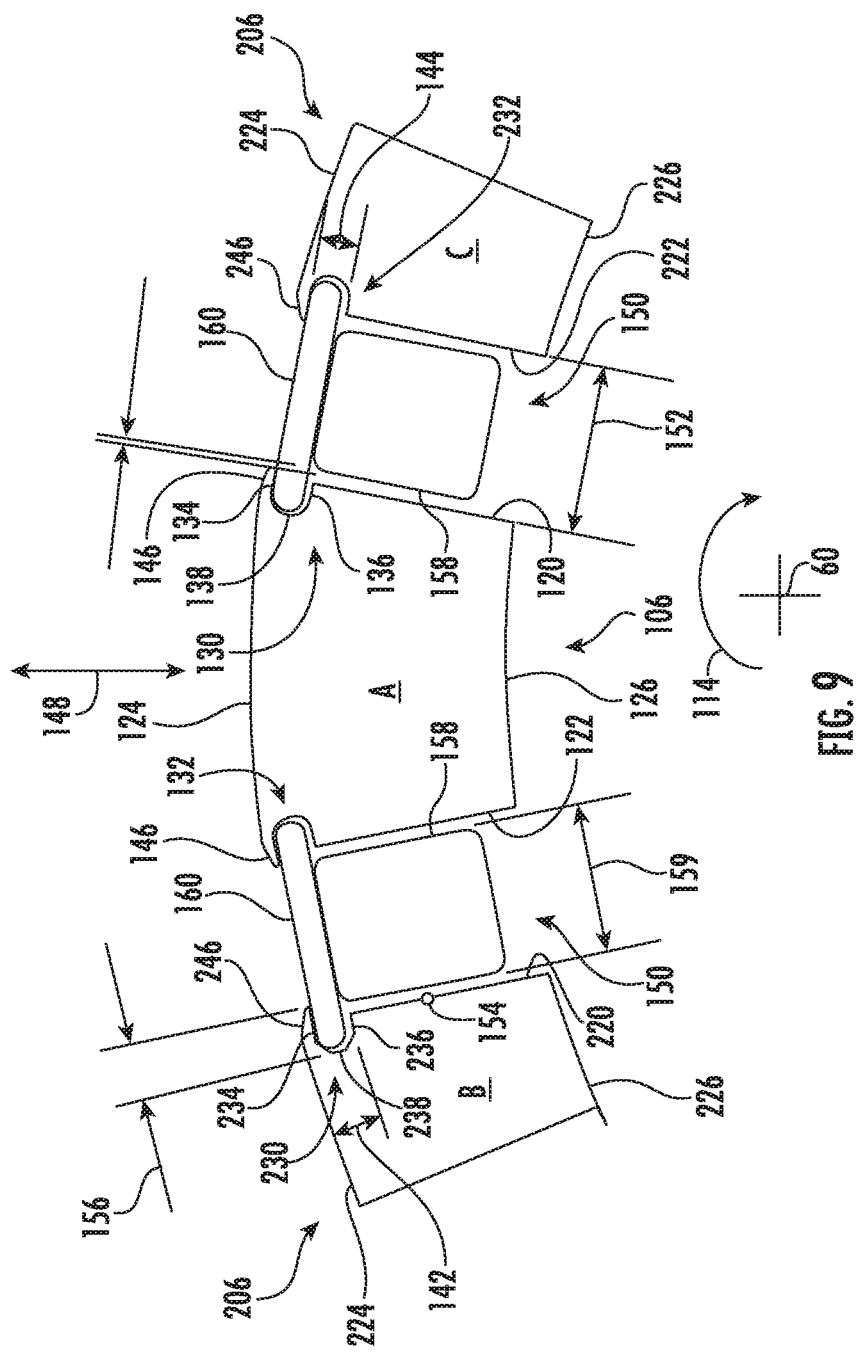
FIG. 9 is a section cut of the circumferential section of the rotor of FIG. 2 taken along line B-B with the section plane passing only through the pole segments, the retainers, and the magnets.

Referring now to FIG. 9, a section cut of the circumferential section of the rotor 100 of FIG. 2 illustrates the spatial relationship among a single pole segment 106 of the first pole piece 102 when interleaved with two pole segments 206 of the second pole piece 202. For purposes of the following description only, the pole segments 106, 206 are additionally identified as Segment A associated with the first pole piece 102 and Segments B and C associated with the second pole piece 202. To better represent the spatial relationship among the pole segments 106, 206, the line B-B along which the section cut is taken in FIG. 2 is a composite line with a first line portion oriented approximately normal to the corresponding leading and trailing side surfaces 122, 220 of Segments A and B and a second line portion oriented approximately normal to the corresponding leading and trailing side surfaces 120, 222 of Segments A and C. The central axis 60 depicted in FIG. 9 is provided only to give meaning to the direction of rotation indicated by arrow 114 and is not positioned to scale.

When Segment A is interleaved with Segments B and C, the trailing side surface 122 of Segment A faces the leading side surface 220 of Segment B while the leading side surface 120 of Segment A faces the trailing side surface 222 of Segment C. In other words, each circumferentially adjacent pair of first and second pole segments 106, 206 has corresponding leading and trailing side surfaces (surfaces 122 and 220 or surfaces 120 and 222) that face one another (hereinafter referred to as "interfacing" surfaces). The interfacing leading and trailing side surfaces 122, 220 of Segments A and B delimit a respective air gap or channel 150 therebetween, as shown in FIGS. 2 and 9. Similarly, the interfacing leading and trailing side surfaces 120, 222 of Segments A and C delimit a respective air gap or channel 150 therebetween. The channels 150 in the embodiment shown have a constant width due to the orientation and planarity of the leading and trailing side surfaces 120, 122, 220, 222. In other embodiments, the width of the channels 150 may vary between one or more of the radially outer and inner surfaces 124, 126, 224, 226 and between the base and the tip 116, 118, 216, 218 of each adjacent pair of pole segments 106, 206. The channels 150 are typically elongate, extending linearly between the interfacing leading and trailing side surfaces 120, 122, 220, 222 of the adjacent pole segments 106, 206.

For ease of description, the grooves are further designated as leading grooves 130, 230 and trailing grooves 132, 232 in the same manner as the leading and trailing side surfaces 120, 122, 220, 222 are so designated. When Segment A is interleaved with Segments B and C, the trailing groove 132 of Segment A faces the leading groove 230 of Segment B Similarly, the leading groove 130 of Segment A faces the trailing groove 232 of Segment C. Thus, each pair of circumferentially adjacent first and second pole segments 106, 206 has a corresponding pair of leading and trailing grooves 130, 132, 230, 232 that face one another (hereinafter referred to as "interfacing" grooves).

The interfacing leading and trailing grooves 132, 230 of Segments A and B are aligned radially with one another and disposed proximately to the corresponding radially outer surfaces 124, 224 of the pole segments. The interfacing leading and trailing grooves 130, 232 of Segments A and C are also aligned radially with one another and disposed proximately to the corresponding radially outer surfaces 124, 224 of the pole segments 106, 206. As used herein in the context of the radial position of the respective leading and trailing grooves, the term "proximately" means that the grooves 130, 132, 230, 232 are positioned entirely radially outward from a radial midpoint 154 (see Segment B) between the radially outer and inner surfaces 124, 126, 224, 226 of each pole segment 106, 206. In some embodiments, the interfacing leading and trailing grooves 130, 132, 230, 232 of the pole segments 106, 206 are positioned such that the grooves nearly adjoin the radially outer surfaces 124, 224 of the pole segments.

The pole segments 106, 206 each have circumferentially opposite lips 146, 246 delimited by the radially outermost surface portion 134, 234 of each groove 130, 132, 230, 232 and the radially outer surface 124, 224. The lips 146, 246 extend circumferentially away from the pole segments 106, 206 such that a distal portion of each lip 146, 246 overhangs the respective one of the leading and trailing side surfaces 120, 122, 220, 222 to which the groove 130, 132, 230, 233 opens as viewed in a radial direction 148. The lips 146, 246 each have a lip length 156 that extends circumferentially from the connecting surface portion 138, 238 to the distal portion of the lip 146, 246. For instance, Segment B has a lip 246 delimited by the radially outermost surface portion 234 of the leading groove 230. This lip 246 has a lip length 156 that extends circumferentially from the connecting surface portion 238 to the distal portion of the lip 246. As best illustrated in FIG. 9, the distal portion of the lip 246 of Segment B overhangs the leading side surface 220. The lips 146, 246 of each pole segment 106, 206 also have a radial thickness (not shown) measured between the radially outermost surface portions 134, 234 of the grooves 130, 132, 230, 232 and the radially outer surfaces 124, 224 of the respective segments 106, 206. The radial thickness of the lips 146, 246 in at least one embodiment is less than 1.5 mm.

Permanent Magnets

Referring now to FIGS. 2 and 7-9, the rotor 100 also includes a plurality of high-magnetic-strength permanent magnets 158 that are disposed within the channels 150 between the adjacent pole segments 106, 206 to supplement the magnetic field generated by the excitation coil 64. Any of a variety of permanent magnet material may be used for the permanent magnets 158 such as neodymium-iron-boron, samarium-cobalt, or ferrite. The orientation and shape of the permanent magnets 158 is similar to the orientation and shape of the channels 150. In the embodiment shown, the permanent magnets 158 are generally prism-shaped with six substantially flat faces. The prism shape of the permanent magnets 158 provides substantially symmetrical abutting surfaces at their respective interfaces with the leading and trailing side surfaces 120, 122, 220, 222 of the pole segments 106, 206. The prism-shaped permanent magnets 158 are illustrated herein as an exemplary shape, it being understood that other shapes for the permanent magnets will be apparent to the skilled artisan. As best illustrated in FIG. 9, a width 152 of the respective channels 150 between the leading and trailing side surfaces 120, 122, 220, 222 of the adjacent pole segments 106, 206 is larger than a width 159 of the magnets 158 disposed within the channels 150.

Each permanent magnet 158 has a pair of circumferentially opposing pole faces, with the polarized faces corresponding to N and S magnetic polarities, respectively. The polarities of the permanent magnets 158 alternate such that adjacent magnets are of opposite polarity. Therefore, it can be appreciated that pole segments 106 abut permanent magnet pole faces with a first common polarity (i.e., N), and pole segments 206 abut permanent magnet pole faces with a second common polarity (i.e., S). The pole faces of the magnets 158 are immediately adjacent the respective leading and trailing side surfaces 120, 122, 220, 222 on the pole segments 106, 206. Assuming all pole segments 106 have N magnetic polarity and all pole segments 206 have S magnetic polarity, the N-polarized magnet faces are adjacent the side surfaces of each N pole segment 106 and the S-polarized magnet faces are adjacent the side surfaces of each S pole segment 206.

Retainers

Figure 7:
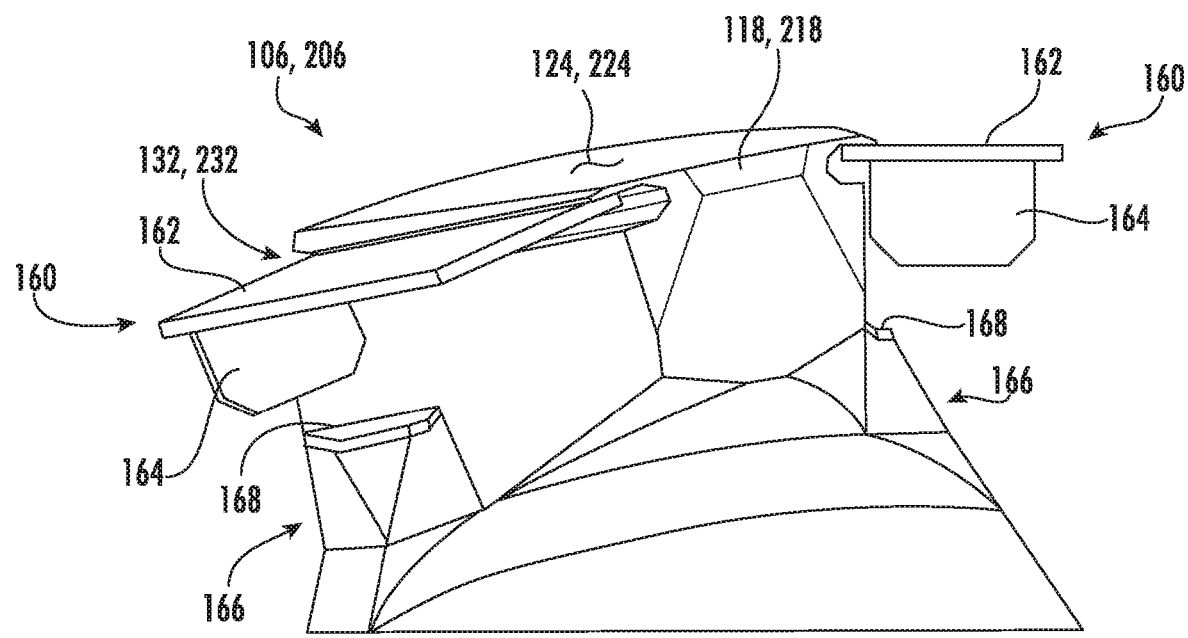
FIGS. 7 and 8 are side perspective views of the pole segment of FIG. 5 showing retainers positioned in the grooves of the pole segment and magnets associated with the retainers.

The rotor 100 further includes a plurality of retainers 160 configured to mechanically support the permanent magnets 158 against the centrifugal forces imparted on the magnets 158 from rotation of the rotor 100. As best illustrated in FIG. 7, each retainer 160 has a planar body portion 162 and a tab portion 164 that extends perpendicularly from the body portion 162 at one end of the retainer 160. The retainer 160 is formed of stainless steel and has a thickness of approximately 0.5 mm. As illustrated in the figures, each retainer 160 is engaged with the interfacing leading and trailing grooves 130 132, 230, 232 of adjacent pole segments 106, 206 to fix the retainer 160 in a radial position. The retainers 160 extend entirely between the channels 150 of adjacent pole segments 106, 206 since the retainers 160 are engaged in the interfacing leading and trailing grooves 130 132, 230, 232 of the pole segments 106, 206.

Each magnet 158 is positioned adjacent to and radially inward of a radially inward facing surface of a respective retainer 160 so as to prevent a radially outward movement of the magnet 158 during rotation of the first and second pole pieces 102, 202. The interfacing leading and trailing grooves 130 132, 230, 232 of adjacent pole segments 106, 206 define a linear path along which the retainers 160 are configured to translate during assembly to the rotor 100. The tab portion 164 of each retainer 160 defines a contact surface oriented normal to the linear path that enables a user to manipulate the position of the retainer 160 and magnet 158 without physically touching the magnet 158. When the retainers 160 and magnets 158 are assembled to the rotor 100, the lips 146, 246 of each pole segment 106, 206 are configured to overhang the magnets 158 to some extent although the amount of overhang is substantially less than that of conventional pole segments.

Ledges

Figure 8:
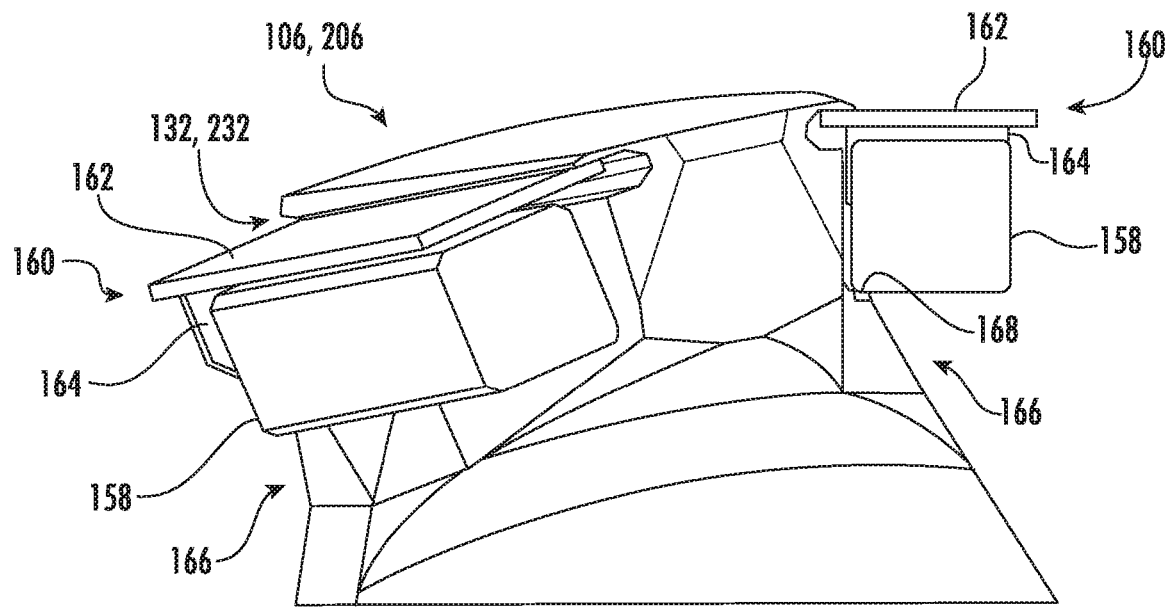

Referring again to FIGS. 3 and 5-8, the leading and trailing side surfaces 120, 122, 220, 222 of each pole segment 106, 206 have protrusions 166 that define respective radially outwardly facing ledges 168. The ledges 168 are disposed proximately to the base 116, 216 of each pole segment 106, 206 and extend no more than one half of the axial extent 140 (FIG. 4) of the pole segment 106, 206 between the base 116, 216 and the tip 118, 218. As best illustrated in FIG. 8, each ledge 168 is configured to set a radially inward position of a corresponding magnet 158 when the magnet 158 is assembled to the pole segment 106, 206. The leading and trailing side surfaces 120, 122, 220, 222 of adjacent pole segments 106, 206 thus provide two ledges 168 spaced diagonally from one another for supporting the corresponding magnet 158 disposed between the surfaces.

Method of Forming Pole Segments

Figure 10:
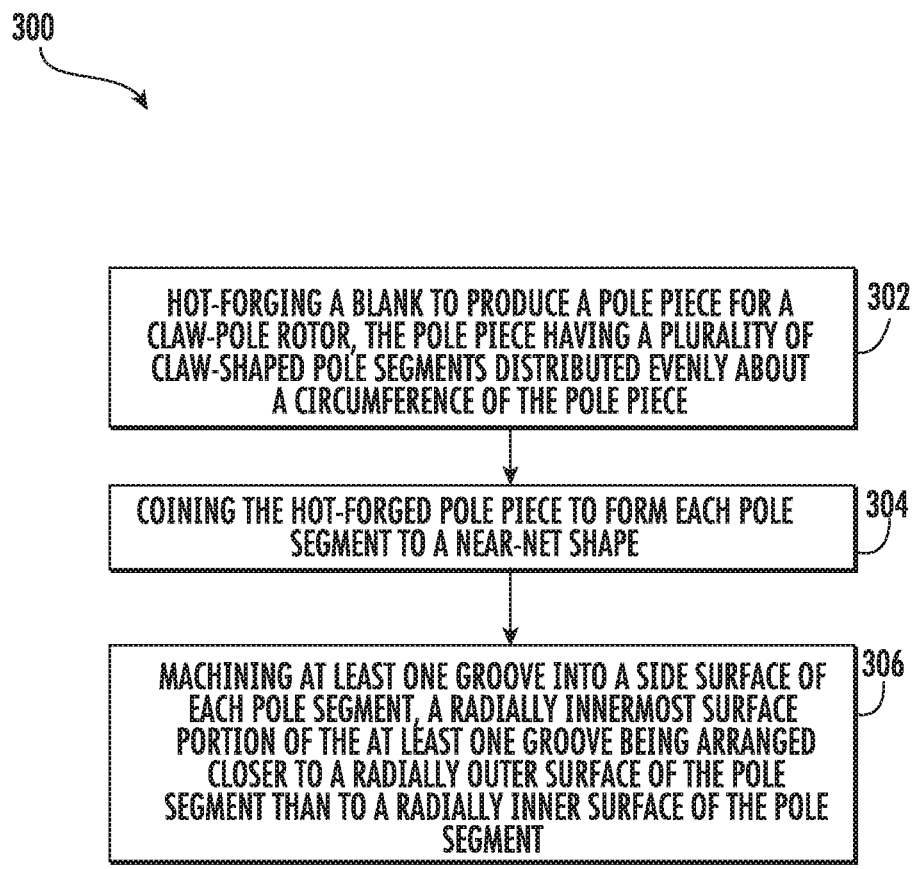
FIG. 10 depicts a method for forming the pole segment of FIG. 2.
Figure 11:
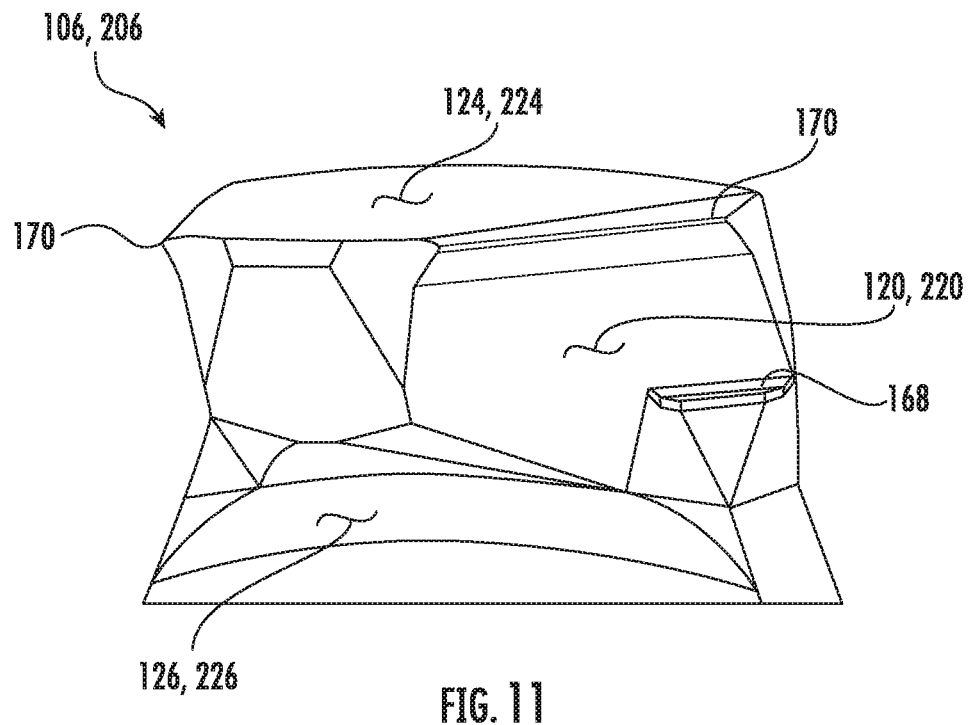
FIG. 11 is a perspective view of a near-net shape pole segment in an intermediate stage subsequent to a forging process.
Figure 12:
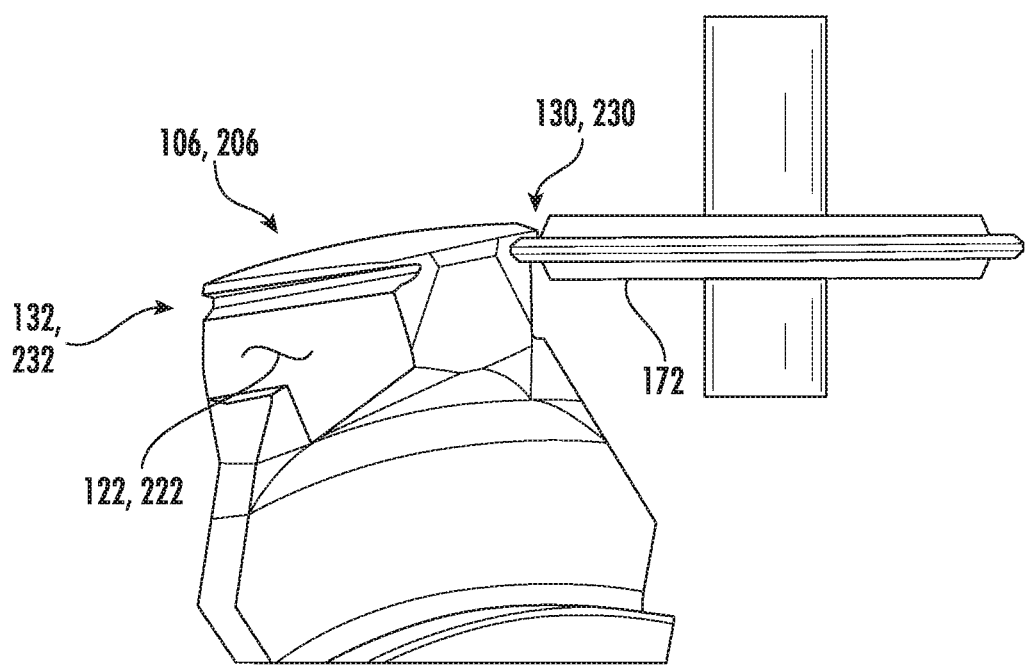
FIG. 12 is a perspective view of the pole segment of FIG. 11 with a cutting tool machining a groove in a side surface of the pole segment.

FIG. 10 depicts a method 300 for forming the pole pieces 102, 202 of FIGS. 1-9. The method 300 is described with reference to the intermediate pole segment structures shown in FIGS. 11 and 12. The method 300 begins by hot-forging a blank (not shown) to form the rough geometry of the pole piece 102, 202 (block 302). The hot-forged pole piece 102, 202 is then subjected to a coining operation to bring the features of the pole segments 106, 206 within a predetermined tolerance and produce the near-net shape of the pole segment illustrated in FIG. 11 (block 304). As shown in FIG. 11, grooves are not yet formed in the pole segments 106, 206 at this stage of the method 300. However, the near-net shape of the pole segments 106, 206 does include relatively thin, circumferentially opposite protrusions 170 near the radially outer surface 124, 224 of the pole segments 106, 206. These protrusions 170 eventually form the distal portion of the lips 146, 246 of each pole segment. Once the hot-forging and coining processes are completed, circumferentially opposite grooves 130, 132, 230, 232 are machined into the leading and trailing side surfaces 120, 122, 220, 222 of each pole segment 106, 206 (block 306). The radially innermost surface portion 136, 236 of the respective grooves 130, 132, 230, 232 is arranged closer to the radially outer surface 124, 224 of the pole segments 106, 206 than to the radially inner surface 126, 226. In some embodiments, the grooves 130, 132, 230, 232 of the pole segments 106, 206 are machined individually with a cutting tool 172, as illustrated in FIG. 11. In other embodiments, the pole pieces 102, 202 may be secured in a jig that places the pole pieces in an orientation that approximates their orientation when mounted on the shaft 28 of the rotor 100. When the pole pieces 102, 202 are secured together in this manner, the interfacing leading and trailing grooves 130, 132, 230, 232 of pairs of adjacent pole segments 106, 206 may be machined simultaneously with a single pass of the cutting tool 172.

General Rotor Construction with Grooved Pole Segments

Referring again to FIGS. 1 and 2, the hybrid alternator 20 is shown with the first and second pole pieces 102, 202 described herein. The alternator 20 has a housing 24 and a rotor shaft 28 supported within the housing 24 by front and rear rolling element bearings 32 and 36, respectively. A belt driven pulley 40 is fastened to a protruding front end of the rotor shaft 28. The alternator 20 includes the rotor 100 with the first and second pole pieces 102, 202 mounted to and rotatable with the shaft 28. The first and second pole segments 106, 206, which are interleaved in a spaced, circumferentially-alternating relationship, define the channels 150 between the circumferentially adjacent pole segments 106, 206. The permanent magnets 158 are disposed within the channels 150 to supplement the magnetic field generated by the field coil 64. To retain the permanent magnets 158 against the centrifugal forces imparted by rotation of the rotor 100, the retainers 160 are engaged in the respective grooves 130, 132, 230, 232 of the circumferentially adjacent pole segments 106, 206.

The alternator 20 includes a stator 52 that surrounds the rotor 100 and is affixed to the housing 24. Rotation of the rotor 100 about the central axis 60 of the alternator causes an alternating current to be induced in a stator winding 62 of the stator 52. The excitation field coil 64 is wound upon an electrically insulative bobbin 66 and the coil 64 and bobbin 66 are positioned between the axially inwardly facing surfaces 110, 210 of the hub portions 104, 204. In the embodiment shown, the field coil 64 and its bobbin 66 are disposed about the axially-extending portions 112 of the pole pieces 102, 202. As will be recognized by those of skill in the art, and as shown in FIGS. 4 and 5, the hub portions 102, 104 each have an annular first body portion 112a with a first circumference and an annular second body portion 112b protruding axially from the first body portion 112a and with a second circumference, the second circumference being diametrically smaller than the first circumference. In other embodiments, the field coil 64 and its bobbin 66 are disposed about a cylindrical rotor core member (not shown) disposed about the central axis 60 and located between the pole pieces 102, 202. A direct current (DC) excitation current is applied to the excitation coil 64 through a pair of slip rings 68 and associated contact brushes 70. The slip rings 68 are secured to the shaft 28 and in operation couple the field coil 64 to a regulated DC current source via the contact brushes 70. A control system known as a voltage regulator (not shown) is used to apply an appropriate level of DC voltage to the excitation coil 64.

The first and second pole pieces 102, 202 and the energized field coil 64 produce an alternating polarity magnetic field that rotates with the rotor 100 about the central axis 60. Although a DC excitation current is applied to the field coil 88, the interlacing of the alternating pole segments 106, 206 generates an alternating polarity magnetic flux linkage. This magnetic flux linkage is presented to winding conductors 63 of the stationary stator 52 that surrounds the rotor 100. The movement of the alternating polarity magnetic flux linkage presented by the rotor 100 across the winding conductors 63 generates three-phase alternating current (AC) electrical power.

The AC electrical output by the alternator 20 is directed to a rectifier 74, which may be located at the rear of the housing 24. The alternator 20 may also include further filtering and power conditioning devices through which the electrical output is directed before it is conducted as DC electrical power to the positive terminal of the vehicle battery (not shown) or an electric distribution bus (not shown). The desired RMS value of the outputted alternating current from the alternator 20 is dependent upon the level of DC voltage applied by the voltage regulator to the excitation coil 64. The alternator also includes front and rear air circulation fans 76, 78 located at opposite axially outward sides of the pole pieces 102, 202. The fans 76, 78 are coupled to the rotor 100 and rotate in unison therewith. Cooling airflow is typically drawn axially inwardly of the housing 24, and is expelled radially outwardly of the housing 24, by the fans 76, 78. The rear fan 78 typically directs cooling airflow across the rectifier 74 and other electronic components of the alternator 20. If an airflow path is provided, the fans 76, 78 may also direct some amount of cooling airflow around the pole segments 106, 206 and the excitation coil 64.

The direction of rotation of the rotor 100 relative to the stator 52, and thus the direction of movement of the pole segments 106, 206 is shown by arrow 114. Upon energization of the field coil 64 with a regulated DC current the rotor 100 is magnetized, with the adjacent pole segments 106, 206 alternating circumferentially between north (N) and south (S) magnetic polarities. In other words, all first pole segments 106 have N magnetic polarity and all second pole segments 206 have S magnetic polarity. Accordingly, it will be recognized that upon rotation of the rotor 100, the alternating magnetic polarities of the pole segments 106, 206 pass sequentially around the stator 52, thereby inducing an output current in the stator winding 62. Those of ordinary skill in the art will recognize that the respective N and S magnetic polarities of the first and second pole pieces 102, 202 are determined as a function of the chosen direction of DC current flow through the excitation field coil 64.

The pole segments 106, 206 described with reference to FIGS. 1-12 provide many advantages over conventional pole segments. With the enhanced geometry pole segments 106, 206 described herein, the width of the magnet is significantly reduced, which significantly reduces the volume, and therefore the material costs, of the magnets. This reduction in volume is accomplished by machining a groove or slot rather than machining a large recess into the entire side face for the purposes of providing a lip for the magnet retainer. Because the groove is machined into the segment and the entire segment side face is not recessed from the machining operation, the magnet overlap is reduced and the magnet width is similarly minimized. Since the magnet width is less, the circumferential width of the pole segment is wider, which reduces the pole magnetic reluctance (lowers flux density in the pole), which in turn results in higher machine flux and performance.

Since only the narrow groove is machined with the enhanced geometry pole segments 106, 206, the amount of material machined away is greatly reduced and the machining feed rate may be increased, which reduces machining cost. Further, machining the groove results in a pole segment outer edge geometry that is advantageous to the electromagnetic machine design. If the groove was formed by a typical forging and coining process, the radial depth of the groove would be much greater because of the approximate 0.75 mm minimum radius required on all edges when using these processes. This minimum radius would result in a 3.5 mm minimum radial depth to the bottom of the groove where the magnet would face, causing the magnet to shift inward and resulting in a reduction of the space for the field coil or a reduction in the radial depth of the magnet. Either change results in lowered performance. However, by machining the groove, the radial depth to the bottom of the groove is reduced. This enhanced geometry is desirable to prevent the inward shifting of the magnet described above.

Machining the groove versus forging also has a secondary benefit of minimizing the thickness of the resulting lip of the pole segment after the machining process. This result is advantageous to minimize the risk of demagnetization of the magnet. Due to armature reaction, the trailing edge of the pole segment has a high concentration of flux. Under a potential demagnetization condition, such as a short circuit, the area of concern for the magnet is its outermost edge where the magnet faces the trailing edge of the pole segment. As the radial depth or thickness of the lip area is decreased, the MMF of the armature reaction decreases and reduces the demagnetization potential. As the risk of demagnetization is diminished, the width of the magnet may be reduced, further reducing costs.

The foregoing detailed description of one or more embodiments of the stator core has been presented herein by way of example only and not limitation. It will be recognized that there are advantages to certain individual features and functions described herein that may be obtained without incorporating other features and functions described herein. Moreover, it will be recognized that various alternatives, modifications, variations, or improvements of the above-disclosed embodiments and other features and functions, or alternatives thereof, may be desirably combined into many other different embodiments, systems or applications. Presently unforeseen or unanticipated alternatives, modifications, variations, or improvements therein may be subsequently made by those skilled in the art which are also intended to be encompassed by the appended claims. Therefore, the spirit and scope of any appended claims should not be limited to the description of the embodiments contained herein.

What is claimed is:

1. A rotor for a rotary electric machine, comprising:
    a first pole piece having a plurality of first pole segments distributed evenly about a rotation axis, the first pole segments each having at least one first groove;
    a second pole piece having a plurality of second pole segments distributed evenly about the rotation axis and interleaved in a spaced, circumferentially-alternating relationship with the first pole segments, the second pole segments each having at least one second groove, the first and second grooves positioned proximately to respective radially outer surfaces of the first and second pole segments, wherein the first and second pole segments each have a respective circumferentially-protruding ledge that is spaced radially inwardly from the first and second grooves and extends less than one half of an axial extent of the respective pole segment;
    at least one retainer engaged with the first and second grooves of a circumferentially adjacent pair of first and second pole segments; and
    at least one permanent magnet disposed between the circumferentially adjacent pair of first and second pole segments and supported against a radially inner surface of the retainer.

2. The rotor of claim 1, wherein the at least one first groove includes two circumferentially opposite first grooves and the at least one second groove includes two circumferentially opposite second grooves, each circumferentially adjacent pair of first and second pole segments having interfacing first and second grooves.

3. The rotor of claim 2, wherein the at least one retainer includes a plurality of retainers each having a planar body portion engaged with the interfacing first and second grooves of the circumferentially adjacent pairs of first and second pole segments.

4. The rotor of claim 3, wherein the at least one permanent magnet includes a plurality of permanent magnets disposed respectively between the circumferentially adjacent pairs of first and second pole segments and supported respectively against the radially inner surface of each retainer.

5. The rotor of claim 3, wherein the interfacing first and second grooves define a linear path along which each retainer is configured to translate, and wherein each retainer has a tab portion extending radially inwardly from the body portion, the tab portion providing a contact surface oriented normal to the linear path for a user to manipulate the retainer without touching the permanent magnet.

6. The rotor of claim 1, wherein the first and second pole segments each have a respective lip delimited by the respective radially outer surface and a radially outermost surface portion of the respective first and second groove, the lips extending circumferentially away from the first and second pole segments such that a distal portion of each lip overhangs the permanent magnet.

7. A pole piece for a rotor of a rotary electric machine, comprising:
    a magnetic hub portion configured to rotate about a central axis;
    a plurality of magnetic pole segments distributed evenly about a circumference of the hub portion, each pole segment having a base connected to the hub portion and a tip disposed axially opposite the base, the pole segments each defining circumferentially opposite side surfaces that extend between the base and the tip and radially opposite outer and inner surfaces that extend between the side surfaces, wherein each pole segment includes at least one groove that is recessed in the side surface, a radially innermost surface portion of the at least one groove being arranged closer to the radially outer surface than to the radially inner surface, and wherein each pole segment further includes a ledge positioned radially inward from said at least one groove;

a stainless steel magnet retainer engaged in the at least one groove.

8. The pole piece of claim 7, further comprising a permanent magnet disposed adjacent to the side surface of the pole segment and supported between said ledge and a radially inner surface of the retainer.

9. The pole piece of claim 7, wherein the at least one groove of each pole segment includes two circumferentially opposite grooves extending linearly along the respective side surfaces of the pole segment.

10. The pole piece of claim 7, wherein the radially innermost surface portion of the at least one groove has a radial depth of less than 3.5 mm from the radially outer surface.

11. The pole piece of claim 7, wherein a radial spacing between the radially innermost surface portion and a radially outermost surface portion of each groove is approximately 0.5 mm.

12. The pole piece of claim 8, wherein each pole segment has a lip delimited by the radially outer surface and a radially outermost surface portion of the at least one groove, the lip extending circumferentially away from the pole segment such that a portion of the lip overhangs the permanent magnet.

13. The pole piece of claim 12, wherein a radial thickness of each lip measured between the radially outermost surface portion of each groove and the radially outer surface is less than 1.5 mm.

14. A pole piece for a rotor of a rotary electric machine, comprising:

a magnetic hub portion configured to be mounted to a shaft of the rotor for rotation about a central axis, the hub portion having an annular first body portion with a first circumference and an annular second body portion protruding axially from the first body portion and with a second circumference, the second circumference being diametrically smaller than the first circumference;

a plurality of magnetic pole segments distributed evenly about the first circumference, the pole segments each having a base connected to the first circumference and a tip disposed axially opposite the base such that the pole segments radially overhang the second circumference and extend axially beyond the second body portion, the pole segments each defining circumferentially opposite side faces that extend between the base and the tip and radially opposite outer and inner surfaces that extend between the side faces, wherein the pole segments each have a pyramidal shape such that the radially inner surface is closer to the central axis at the base than at the tip and the side surfaces are circumferentially wider at the base than at the tip, and wherein respective grooves are recessed in the side surfaces of each pole segment, the grooves extending linearly from the base to the tip of each pole segment and being substantially positioned adjacent to the radially outer surface of the pole segment;

a plurality of stainless steel retainers engaging the grooves of the pole segments, each of the plurality of retainers including a planar body portion with a tab portion at a first end that extends perpendicular to the planar body portion, and an free edge at a second end opposite the first end; and a plurality of permanent magnets supported by the stainless steel retainers.

15. The pole piece of claim 14 wherein the pole segments each have a respective circumferentially-protruding ledge that is spaced radially inward from the respective groove of said pole segment and radially inward from a respective retainer engaging said groove, and wherein one of the plurality of permanent magnets is positioned between said respective groove and said respective retainer.

16. The pole piece of claim 15 wherein the ledge extends less than one half of an axial extent of the respective pole segment.

17. The pole piece of claim 7 wherein the retainer includes a planar body portion engaged in the at least one groove and a tab portion that extends perpendicularly from the body portion.

18. The pole piece of claim 7 wherein the ledge is a circumferentially-protruding ledge that is spaced radially inwardly from the at least one groove and extends less than one half of an axial extent of the respective magnetic pole segment.

19. The rotor of claim 1 wherein the retainer is comprised of stainless steel and includes a thin planar body portion.

* * * * *